United States Patent
Evans

Patent Number: 5,079,291
Date of Patent: Jan. 7, 1992

[54] POLAR APROTIC CATALYSTS FOR FORMATION OF FLUOROSILICONE FLUIDS

[75] Inventor: Edwin R. Evans, Clifton Park, N.Y.

[73] Assignee: General Electric Company, Waterford, N.Y.

[21] Appl. No.: 439,741

[22] Filed: Nov. 20, 1989

[51] Int. Cl.$^5$ ............................................. C08J 3/00
[52] U.S. Cl. ....................................... 524/725; 524/726; 524/729; 524/742; 528/12; 528/21; 528/23; 528/37; 556/459
[58] Field of Search .................... 528/21, 23, 12, 37; 524/725, 726, 742, 729; 556/459

[56] References Cited

U.S. PATENT DOCUMENTS

| | | | |
|---|---|---|---|
| 2,634,284 | 4/1953 | Hyde | 260/448.2 |
| 3,853,932 | 12/1974 | Razzano | 260/448.2 |
| 3,903,047 | 9/1975 | Ashby | 260/46.5 |
| 4,157,337 | 6/1979 | Evans | 260/448.2 |
| 4,317,899 | 3/1982 | Bluestein et al. | 556/467 |
| 4,551,515 | 11/1985 | Herberg et al. | 528/18 |
| 4,683,277 | 7/1987 | Maxson | 528/21 |
| 4,780,519 | 10/1988 | Saam et al. | 528/14 |
| 4,888,405 | 12/1989 | Gamon et al. | 528/23 |
| 4,977,290 | 12/1990 | Evans et al. | 556/459 |

*Primary Examiner*—Melvyn I. Marquis
*Assistant Examiner*—Margaret W. Glass

[57] ABSTRACT

There is provided a fluorosilicone composition comprising:
(1) a cyclic trimer represented by the general formula:

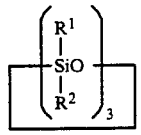

wherein $R^1$ is $C_{1-8}$ alkyl, preferably methyl; $R^2$ is $C_{1-8}$ haloalkyl, preferably trifluoropropyl; and x ranges from 3 to 10 and averages about 6;
(2) water; and
(3) a mixture comprising by weight about 20% to about 52% of a polar aprotic solvent and about 80% to about 48% of an organic nonaprotic solvent.

25 Claims, No Drawings

POLAR APROTIC CATALYSTS FOR FORMATION OF FLUOROSILICONE FLUIDS

CROSS REFERENCE TO RELATED APPLICATIONS

Reference is made to the concurrently filed application identified as U.S. Pat. No. 4,977,290.

BACKGROUND OF THE INVENTION

In the production of fluorosilicone elastomers from low molecular weight, silanol end-stopped fluids, the typical process involves the acid or base catalyzed condensation of the silanol groups to form long chain polymers. Such a process works very well to form high molecular weight gums, i.e. polymers with a viscosity of 1,000,000 centipoise at 25° C. or greater. However, when attempting to form polymers with a viscosity of less than 1,000,000 centipoise (at 25° C.), the final viscosity is very hard to control. As a result, ancillary steps to the process must be accomplished to yield a saleable product.

For example, in the condensation of such polymers by an acid or base catalyst it is necessary to neutralize the catalyst when the polymer viscosity (and hence molecular weight) has been achieved. This neutralization step is necessary in order to prevent the continuance of the reaction. Thus, in a base catalyzed reaction, it is necessary to add enough acid to neutralize the catalyst. Conversely, in an acid catalyzed reaction, it is necessary to add enough base to neutralize the acid. However, if too much acid or base is added to neutralize the catalyst, the neutralizing agent itself will act to further polymerize the material.

In such systems the viscosity of the resultant polymer is hard to control since the viscosity (and hence molecular weight) is dependent upon the amounts of catalysts and neutralizing agents used, the cycle times for the reactions, the presence or absence of polymerization promoters, and the successful removal of catalysts when it is desirable to stop the reaction. In such systems it is difficult to control the polymer viscosity to within 200 centipoise, and it is often the case that the polymerization will run away causing the material in the reaction vessel to achieve a molecular weight which is too high. Consequently, the fluid is not suitable for blending.

It is desirable, however, that the viscosity of the resultant polymer be controlled to within 100 centipoise, more preferably to within 50 centipoise, of the targeted viscosity. To accomplish this it is necessary to develop a new catalyst system to be able to control to greater accuracy the final product viscosity. Thus, it is an object of this invention to develop a process for the polymerization of low molecular weight silicone fluids wherein the final product viscosity may be easily and accurately controlled.

SUMMARY OF THE INVENTION

According to the objectives of this invention there is provided a fluorosilicone composition comprising:
(A) A silanol endstopped fluid represented by the general formula:

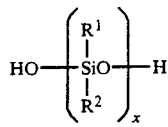

wherein $R^1$ is $C_{1-8}$ alkyl, preferably methyl; $R^2$ is $C_{1-8}$ haloalkyl, preferably trifluoropropyl; and x ranges from 3 to 10 and averages about 6;
(B) a mixture comprising by weight about 20% to about 52% of a polar aprotic solvent and about 80% to about 48% of an organic nonaprotic solvent; and
(C) water.

Also, according to the objectives of this invention, there is provided a process for producing a halogenated silicone using the foregoing composition.

DETAILED DESCRIPTION OF THE INVENTION

By this invention there is provided a fluorosilicone composition comprising:
(A) a silanol endstopped fluid represented by the general formula:

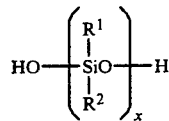

wherein $R^1$ is $C_{1-8}$ alkyl, preferably methyl; $R^2$ is $C_{1-8}$ haloalkyl, preferably trifluoropropyl; and x ranges from 3 to 10 and averages about 6;
(B) a mixture comprising by weight about 20% to about 52% of a polar aprotic solvent and about 80% to about 48% of an organic nonaprotic solvent; and
(C) water.

The present invention is primarily directed to a fluorosilicone composition comprising:
(1) a cyclic trimer represented by the general formula:

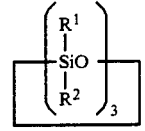

wherein $R^1$ is $C_{1-8}$ alkyl, preferably methyl; $R^2$ is $C_{1-8}$ haloalkyl, preferably trifluoropropyl; and x ranges from 3 to 10 and averages about 6;
(2) water; and
(3) a mixture comprising by weight about 20% to about 52% of a polar aprotic solvent and about 80% to about 48% of an organic nonaprotic solvent.

Preferably, each R' radical in the silanol endstopped fluid is selected from $C_{1-8}$ alkyl radical, $C_{1-8}$ haloalkyl radicals, and $C_{1-8}$ cycloalkyl radicals. Such radicals include, but are not limited to, methyl, ethyl, propyl, butyl, monochloromethyl, monochloroethyl, monochloropropyl, monofluoromethyl, difluoroethyl, trifluoropropyl, and cyclohetyl.

Preferably, each R' radical is selected from alkyl radicals of one to eight carbon atoms and a monovalent group represented by the formula:

R³CH₂CH₂— where $R^3$ is a perfluoroalkyl radical. Most preferably, each R radical is selected from the group consisting of methyl and trifluoropropyl.

A preferred low molecular weight silanol polymer is that obtained by the process described in copending application identified as U.S. Pat. No. 4,977,290 assigned to the same assignee as the present application. It was filed on the same date as this application and is herein incorporated by reference. Briefly, such polymers may be represented by the formula:

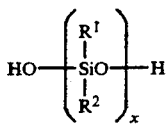

wherein $R^1$ is $C_{1-8}$ alkyl, preferably methyl; $R^2$ is $C_{1-8}$ haloalkyl, preferably trifluoropropyl; and x ranges from 3 to 10 and averages about 6.

A preferable method of obtaining the the starting low molecular weight silanol polymer is also taught in copending application identified as U.S. Pat. No. 4,977,290. Therein, a fluoro-substituted, silanol endstopped silicone fluid is produced by the ring opening polymerization of a fluoro-substituted cyclic trimer using an aprotic solvent as the catalyst. This method is preferable because the aprotic solvent useful for the ring opening polymerization can, if desired, also be used to continue the condensation polymerization of the cyclic trimer.

Thus, it is readily apparent that, if desired, one skilled in the art may be able to obtain a high molecular weight polymer by using a fluoro-substituted cyclic trimer as the polymer precursor rather than the low molecular weight silanol endstopped polymer designated herein as component (A).

The aprotic solvents useful in this invention are polar solvents which neither donate nor accept protons. It has been found that such solvents will catalyze the condensation of silanol terminated diorganopolysiloxanes. Examples of these solvents include, but are not limited to, acetonitrile, dimethylacetamide, dimethylformamide, dimethylsulfoxide, n-methylpyrrolidone, and propylene carbonate. Such solvents are readily obtainable from commercial sources. Of these listed, acetonitrile has been found to be preferable in that the resultant reaction proceeds more readily.

The amount of aprotic solvent necessary to effect the condensation of the silanol end groups is preferably at least 20% of the solvent mixture. Thus, the aprotic solvent may be contained in a mixture of solvents, and it will catalyze the condensation reaction as long as the minimum level is maintained. The examples which follow demonstrate such a solvent mixture by illustrating the use of acetonitrile in acetone. Although it is possible to use a solvent that consists entirely of an aprotic solvent, such solvents usually cost many times more than other commonly used solvents. By using a mixture, therefore, it is possible to economize the process without affecting the reaction.

It is also possible to use a mixture of one or more aprotic solvents or a mixture of one or more aprotic solvents and one or more nonaprotic solvents. The important point to remember is that, of the total solvent used in the reaction system, it is preferable that 20% of the solvent, by weight, must be an aprotic solvent.

The amount of aprotic solvent necessary to practice this invention is also dependent on the temperature at which the reaction occurs. From this it is also readily apparent that, no matter what the level of aprotic solvent, heating will facilitate the reaction.

When using a mixture of aprotic solvent(s) and nonaprotic solvent(s) it is necessary only that the different solvents be miscible with each other. In the combination mentioned above, acetonitrile in acetone, acetone was selected because it has a polarity that is similar to acetonitrile. This similarity in polarity allows for better homogeneity in the mixture. However, it should be pointed out that acetone itself may have an adverse effect on the reaction. If more than 80% of the solvent mixture is acetone there tends to be a substantial increase in cyclic by-products rather than the desirable linear ones. Further, it is important to note that, as the concentration of aprotic solvent in the solvent mixture is decreased, a proportional increase in the amount of water is necessary.

Water, in this invention, acts as a chain transfer agent in the condensation of the silanol polymers. Thus, it is readily apparent that the amount of water is inversely proportional to resultant molecular weight of the silicone polymer at the completion of the reaction.

For the best results there should be utilized an amount of water equal to the stoichiometric amount. It is theorized that the water complexes with the aprotic solvent, and, as a chain end becomes available it is hydrated by insertion of water onto the chain ends.

It is also important to note that water is the only useful hydrolyzing component. Neither silanols, e.g. $Me_3SiOH$, nor alcohols, e.g. $Me_3COH$, will act to hydrolyze the chain ends of the resultant silicone polymer using an aprotic solvent as the catalyst.

The silanol chain ends of the resultant polymer may be functionalized by reaction with hexamethyldisilazane or divinyltetramethyldisilazane. Such reactions are well known in the art. The amounts useful for practice of this invention are preferably 2.5 to 3.0 times the stoichiometric amount.

The compositions and processes described herein are useful for producing a silicone polymer having a viscosity up to about 500,000 centipoise at 25° C. It is preferable, however, that the silicone polymer have a viscosity in the range of 300 to 4,000 centipoise at 25° C. It is most preferable that the silicone polymer have a viscosity in the range of 500 to 2,000 centipoise at 25° C. By following the process outlined here it is also possible to control the viscosity of the silicone polymer very accurately to within 100 centipoise of the target viscosity. In fact, control to within 50 centipoise of the target viscosity is possible.

Finally, removal of the aprotic solvent catalyst is, as it turns out, a very simple step. Distillation is usually carried out in order to separate the linear products from the cyclics. During this step the volatile aprotic solvent is also removed. Thus, further neutralization or separation equipment for removal of the catalyst is not necessary.

The following examples are given for the purpose of illustrating the invention and should not be read as limiting the scope of the invention.

EXAMPLE 1

A total of 1310 grams of 2,4,6-trimethyl-2,4,6-tris(3,3,3-trifluoropropyl)cyclotrisiloxane was dissolved in a mixture of acetone and acetonitrile (210 and 225 grams respectively). A total of 10.5 grams of distilled water was added and the mixture was refluxed for 2.5 hours at 78° C. The reaction vessel was blanketed with nitrogen and 160 grams of hexamethyldisilazane (95.4% reactive by GC) was added below the surface while agitating the clear solution. The addition took approximately 30 minutes, during which time ammonia was evolved as indicated by positive litmus test of the exit vapors. The mixture was then refluxed for one more hour and the solvents were distilled while sparging with nitrogen. Upon removal of the solvents and other volatiles (477.4 grams) the vessel temperature was approximately 160° C. A vacuum of 25 mm of mercury was applied while maintaining a nitrogen sparge to remove 288.1 grams of a mixture of fluorosilicone cyclics. The stripping temperature was not allowed to exceed 210° C. The resultant clear fluid (937 grams) contained 0.0 weight percent volatiles and had a Brookfield viscosity of 1000 centipoise at 25° C. The specific gravity of this fluid was 1.2714.

EXAMPLE 2

The reaction described in Example 1 was repeated using 1332 grams of fluorosilicone trimer and 310 grams and 256 grams, respectively, of acetone and acetonitrile. This amount of acetone/acetonitrile decreased solids content from 74.6 weight percent in Example 1 to 70 weight percent in Example 2. The amount of water was also reduced from 8.0 grams per 1000 grams of trimer to 7.5 grams per 1000 grams of trimer. The mixture was refluxed for 3 hours prior to termination of hexamethyldisilazane (added over a period of one hour). The composition was then distilled to remove the solvents while sparging with nitrogen. After 3.5 hours the temperature of the vessel was 135° C. and a vacuum of 3 mm of mercury was applied while continuing to sparge with nitrogen. A clear fluid, measuring 1140.9 grams, was recovered. The fluid had a viscosity of 960 centipoise at 25° C. and a volatiles content of 1.64%. The specific gravity of this fluid was 1.2678.

EXAMPLE 3

A total of 1400 grams of fluorosilicone cyclic trimer was dissolved in a mixture of 224 grams of acetone and 240 grams of acetonitrile. A total of 11.2 grams of water was added and the mixture was refluxed for 4⅔ hours at 78° C. The reaction mixture (which was 75.1 weight percent solids) was blanketed with nitrogen and 210 grams of 1,3-divinyltetramethyldisilazane (89.3% reactive by GC) was added for a period lasting 25 minutes below the surface of the material while agitating the solution. After the addition was complete the nitrogen blanket was discontinued and a nitrogen sparge was started. The solution was then distilled to remove 448 grams of solvent and low boilers. A vacuum of 25 mm of mercury was applied while at a temperature of 155° C. The maximum stripping temperature was held at 205° C. while removing 129.4 grams of fluorosilicone cyclics and 141 grams of unreacted disilazane and cold trap volatiles. A clear fluid measuring 1245.12 grams and 1048 centipoise at 25° C. was recovered after 6 hours of stripping. The volatiles level was 0.66 weight percent and the specific gravity was 1.275.

EXAMPLES 4-16

The reactions of Examples 1-3 were repeated with the amounts of water and acetone/acetonitrile being varied. The results are summarized in Table I, below.

TABLE I

| Ex. | Water g/1000 g Trimer | Chain Ends | Solvent Mixture Acetone | Acetonitrile | % Solids | Viscosity | % Yield |
|---|---|---|---|---|---|---|---|
| 4 | 2.2 | M | 66.6 | 33.4 | 62.5 | 2480 | 74.77 |
| 5 | 7.51 | M | 54.7 | 45.3 | 70.0 | 1360 | 75.1 |
| 6 | 7.8 | M | 66.4 | 33.6 | 62.8 | 768 | 58.9 |
| 7 | 8.0 | Vi | 48.2 | 51.8 | 74.6 | 1286 | 88.2 |
| 8 | 13.9 | M | 67.0 | 33.0 | 62.6 | 544 | 68.5 |
| 9 | 10.9 | M | 48.0 | 52.0 | 74.0 | 1600 | 84.8 |
| 10 | 1.0 | M | 47.8 | 52.2 | 75.3 | 13568 | 76.0 |
| 11 | 10.7 | M | 48.0 | 52.0 | 75.2 | 920 | 88.0 |
| 12 | 2.6 | M | 48.0 | 52.0 | 75.2 | 6200 | 75.3 |
| 13 | 1.4 | Vi | 48.0 | 52.0 | 75.2 | 6200 | 86.0 |
| 14 | 1.5 | Vi | 48.0 | 52.0 | 75.2 | 9680 | 77.8 |
| 15 | 10.0 | M | 80.0 | 20.0 | 75.0 | 1092 | 83.1 |
| 16 | 1.5 | M | 80.0 | 20.0 | 75.0 | 4920 | 79.0 |

The best ratio of acetone to acetonitrile which impacts most favorably upon the yield and viscosity is 48:52 over the range of 20:80 weight percent.

What is claimed is:

1. A fluorosilicone composition comprising:
   (A) a silanol endstopped fluid represented by the general formula:

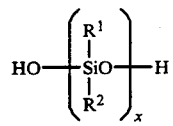

wherein $R^1$ is $C_{1-8}$ alkyl; $R^2$ is $C_{1-8}$ haloalkyl, preferably trifluoropropyl; and x ranges from 3 to 10 and averages about 6;
   (B) a mixture comprising by weight about 20% to about 52% of a polar aprotic solvent and about 80% to about 48% of an organic nonaprotic solvent; and
   (C) water.

2. The fluorosilicone composition of claim 1 wherein each R' radical in component (A) is selected from $C_{1-8}$ alkyl radicals, $C_{1-8}$ haloalkyl radicals, and $C_{1-8}$ cycloalkyl radicals.

3. The fluorosilicone composition of claim 1 wherein each $R^1$ radical is selected from alkyl radicals of one to eight carbon atoms and $R^2$ is a monovalent group represented by the formula $R^3CH_2CH_2-$ wherein $R^3$ is a perfluoroalkyl radical.

4. The fluorosilicone composition of claim 1 wherein each $R^1$ is methyl and each $R^2$ is trifluoropropyl.

5. The fluorosilicone composition of claim 1 further comprising component (D) hexamethyldisilazana.

6. The fluorosilicone composition of claim 1 further comprising component (D) divinyltetramethyldisilazane.

7. A fluorosilicone composition comprising:
   (1) a fluoro-substituted cyclic trimer represented by the general formula:

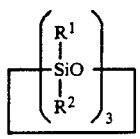

wherein $R^1$ is $C_{1-8}$ alkyl; $R^2$ is $C_{1-8}$ haloalkyl, preferably trifluoropropyl; and x ranges from 3 to 10 and averages about 6;
   (2) water; and
   (3) a mixture comprising by weight about 20% to about 52% of a polar aprotic solvent and about 80% to about 48% of an organic nonaprotic solvent.

8. The fluorosilicone composition of claim 7 wherein each $R^1$ is selected from $C_{1-8}$ alkyl radicals and $C_{1-8}$ cycloalkyl radicals, and $R^2$ is a $C_{1-8}$ haloalkyl radical.

9. The fluorosilicone composition of claim 7 wherein each $R^1$ radical is selected from alkyl radicals of one to eight carbon atoms and $R^2$ is a monovalent group represented by the formula $R^3CH_2CH_2-$ wherein $R^3$ is a perfluoroalkyl radical.

10. The fluorosilicone composition of claim 9 wherein each $R^1$ is methyl and each $R^2$ is trifluoropropyl.

11. The silicone composition of claim 7 further comprising component (D) hexamethyldisilazane.

12. The silicone composition of claim 7 further comprising component (D) divinyltetramethyldisilazane.

13. A process for producing silanol-terminated, fluoro-substituted polydiorganosiloxanes comprising reacting in the presence of a mixture comprising by weight about 20% to about 52% of a polar aprotic solvent and about 80% to about 48% of an organic nonaprotic solvent a composition comprising:
   (1) a fluoro-substituted cyclic trimer represented by the general formula:

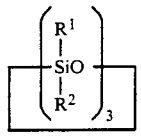

wherein $R^1$ is $C_{1-8}$ alkyl; $R^2$ is $C_{1-8}$ haloalkyl, preferably trifluoropropyl; and x ranges from 3 to 10 and averages about 6; and
   (2) water.

14. A process for producing a fluorosilicone having a viscosity of 300 to 4,000 centipoise at 25° C. comprising the steps of:
   (a) reacting in the presence of a mixture comprising by weight about 20% to about 52% of a polar aprotic solvent and about 80% to about 48% of an organic nonaprotic solvent a composition comprising:
   (1) a fluoro-substituted cyclic trimer represented by the general formula:

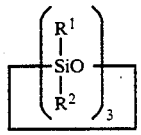

wherein $R^1$ is $C_{1-8}$ alkyl; $R^2$ is $C_{1-8}$ haloalkyl, preferably trifluoropropyl; and x ranges from 3 to 10 and averages about 6; and
   (2) water; and
   (b) reacting the reaction mixture of (a) with hexamethyldisilazane or divinyltetramethyldisilazane.

15. A composition according to claim 1 wherein the aprotic solvent is acetonitrile and the organic solvent is acetone.

16. A composition according to claim 15 wherein the ratio of acetone to acetonitrile is 48:52.

17. A composition according to claim 7 wherein the fluoro-substituted cyclic trimer is 2,4,6-trimethyl-2,4,6-tris(3,3,3-trifluoropropyl)cyclotrisiloxane.

18. A composition according to claim 7 wherein the aprotic solvent is acetonitrile and the organic solvent is acetone.

19. A composition according to claim 18 wherein the ratio of acetone to acetonitrile is 48:52.

20. A composition according to claim 13 wherein the fluoro-substituted cyclic trimer is 2,4,6-trimethyl-2,4,6-tris(3,3,3-trifluoropropyl)cyclotrisiloxane.

21. A process according to claim 13 wherein the apriotic solvent is acetonitrile and the organic solvent is acetone.

22. A process according to claim 21 wherein the ratio of acetone to acetonitrile is 48:52.

23. A composition according to claim 14 wherein the fluoro-substituted cyclic trimer is 2,4,6-trimethyl-2,4,6-tris(3,3,3-trifluoropropyl)cyclotrisiloxane.

24. A process according to claim 14 wherein the aprotic solvent is acetonitrile and the organic solvent is acetone.

25. A composition according to claim 24 wherein the ratio of acetone to acetonitrile is 48:52.

* * * * *